United States Patent
Fukuda et al.

(10) Patent No.: US 8,274,684 B2
(45) Date of Patent: Sep. 25, 2012

(54) IMAGE PROCESSING APPARATUS AND IMAGE PROCESSING METHOD FOR PROCEESING READING BLOCKS

(75) Inventors: Hiroaki Fukuda, Tokyo (JP); Tomoyuki Yoshida, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 867 days.

(21) Appl. No.: 12/382,279

(22) Filed: Mar. 12, 2009

(65) Prior Publication Data
US 2009/0237714 A1 Sep. 24, 2009

(30) Foreign Application Priority Data
Mar. 18, 2008 (JP) ................ 2008-069414

(51) Int. Cl.
*G06F 3/12* (2006.01)
*G06K 1/00* (2006.01)
(52) U.S. Cl. ..................... 358/1.15; 358/1.13
(58) Field of Classification Search ........... 358/1.1, 358/1.8, 1.9, 1.12, 1.13, 1.14, 1.15, 1.18, 358/400, 464, 500
See application file for complete search history.

(56) References Cited

U.S. PATENT DOCUMENTS

| | | | |
|---|---|---|---|
| 7,738,138 B2 * | 6/2010 | Maeda | 358/1.9 |
| 7,751,099 B2 * | 7/2010 | Mizuhashi et al. | 358/488 |
| 7,916,975 B2 * | 3/2011 | Tone | 382/305 |
| 8,139,252 B2 * | 3/2012 | Morohashi et al. | 358/1.15 |
| 2003/0031375 A1 * | 2/2003 | Enomoto | 382/255 |
| 2007/0248288 A1 * | 10/2007 | Nagao et al. | 382/303 |

FOREIGN PATENT DOCUMENTS

| | | |
|---|---|---|
| JP | 06-332997 | 12/1994 |
| JP | 07-078245 | 3/1995 |
| JP | 2000-165655 | 6/2000 |
| JP | 2006-252154 | 9/2006 |

* cited by examiner

*Primary Examiner* — Gabriel Garcia
(74) *Attorney, Agent, or Firm* — Harness, Dickey & Pierce, P.L.C.

(57) ABSTRACT

In a first route, image data from an image reading unit is processed by both a first image processing block and a second image processing block and sent to a storage unit, and in a second route, the image data processed by the first image processing block is stored in the storage unit and image data from the storage unit is processed by the second image processing block and sent to the storage unit. The control unit switches a process of the second image processing block according to a result of a process of the first image processing block, and switches an input source to the second image processing block according to a process content of the second image processing block.

20 Claims, 7 Drawing Sheets

IMAGE PROCESSING APPARATUS AND IMAGE PROCESSING METHOD FOR PROCEESING READING BLOCKS

CROSS-REFERENCE TO RELATED APPLICATIONS

The present application claims priority to and incorporates by reference the entire contents of Japanese priority document 2008-069414 filed in Japan on Mar. 18, 2008.

BACKGROUND OF THE INVENTION

1. Field of the Invention

The present invention relates to a technology for processing image data obtained by reading an image of an original with an image reading unit.

2. Description of the Related Art

Recently, with the development of reading units that use a line sensor formed of a charge-coupled device (CCD) photoelectric conversion element and of toner-writing units that use laser emission, digital copying machines that make copies using digital image data have appeared on the market from analog copying machines. The digital copying machine becomes highly compatible with other devices that handle digital image data, and not only includes a function as a copier but also includes various functions such as a facsimile function, a printer function, and a scanner function, so that it is now called a digital multifunction product (MFP).

Technologies related to the MFP have advanced to provide a memory such as a hard disk drive (HDD) having a higher capacity, cost reduction, faster network communication technology, a central processing unit (CPU) with improved throughput, and technique (e.g., data compression technique) related to digital image data. The advancement in MFP technologies leads to a wide variety of functions incorporated in the MFP. Besides, the use of the MFP is also diversified. For example, a compact MFP is placed next to a personal computer (PC) as paired use, so that an operator can easily use the functions of a copier, a facsimile, a printer, and a scanner. A medium-size MFP is shared by a plurality of members in each department unit or section unit, and productivity to a certain extent and functions such as sorting, punching, and stapling can be used. Furthermore, a large-size MFP is used in a department of a company that concentratedly performs copying related tasks, or in companies that perform copying related business as main business, and therefore, high-productivity and high-quality multifunctional products are used therein.

In this manner, the MFPs are diversified from the compact class to the large-size class, however, there are some functions that can be shared over the classes, and there are some functions that are strongly requested by and specific to the respective classes. For example, the large-size MFP is requested to perform finishing works on plotted paper such as punching, stapling, and paper folding, and to make the data in the form of electronic filing simultaneously when the data is copied. The compact MFP is requested to enhance an internet facsimile (FAX) function and a PC-FAX function or the like, or is requested to achieve high-quality image printing for specific paper for personal use.

As explained above, a system in which functions required for the classes are set is constructed and provided so far to the MFP market being diversified. The importance of the value of information in business is already recognized, and thus, information is requested to be not only quickly, accurately, and surely transferred but also understandably and effectively transferred. Moreover, in association with speed up and widespread use of communication technology, higher capacity of the memory, cost reduction, minimization, or high performance of PC, new functions efficiently handling information using digital data are provided. The new functions are provided one after another especially to the MFP that handles digital image data as a part of digital data, or integration of the functions is achieved therein.

For example, Japanese Patent Application Laid-open No. 2000-165655 proposes an image processing apparatus capable of performing synthesis in various forms by coping with magnification in a wider scaling factor and of relaxing limit of a readable image area due to a storage capacity of a memory.

Japanese Patent Application Laid-open No. H07-78245 proposes an image processing apparatus capable of implementing an image output process at high speed with less image degradation even if the image processing apparatus does not include a full-size page memory.

However, the MFP in which the functions are diversified in the above manner, particularly, the compact MFP is placed next to a PC as paired use, so that the operator can easily use the functions of a copier, a facsimile, a printer, and a scanner. Therefore, the compact MFP is widely used not only by users in small offices such as small office/home office (SOHO) but also by home users and users in medium/large offices. Therefore, functions required by the users are diversified, and new functions continuously provided to meet the requirements become complicated. Consequently, it is quite difficult to balance between achievement of a function containing all the new functions and cost reduction which is the most significant feature of the compact MFP.

For example, in Japanese Patent Application Laid-open No. 2000-165655, a method of relaxing the limit to a readable image size due to the capacity of the memory is implemented by switching methods of scaling processes according to usable memory capacity and whether there is a rotation process using the memory, to perform an image processing. However, this method does not relax the limit to the image processing corresponding to types of the image processing, and thus, it is not the best solution suitable for situations.

Further, in Japanese Patent Application Laid-open No. H07-78245, the image processing is performed by setting ways of using a page memory and an image registration memory and automatically switching between the ways according to the capacity of image data to be processed even if the full-size page memory is not incorporated in the image processing apparatus. However, this case also does not solve an image processing related problem corresponding to the type of the image processing, and thus, it is not the best solution suitable for situations.

SUMMARY OF THE INVENTION

It is an object of the present invention to at least partially solve the problems in the conventional technology.

According to one aspect of the present invention, there is provided an image processing apparatus including an image reading unit that reads an original to obtain image data; a storage unit that stores therein image data; an image-data processing unit that processes the image data from either one of the image reading unit and the storage unit; and a control unit that controls the image reading unit, the storage unit, the image-data processing unit, and a connection between the units. The image-data processing unit includes a first image processing block for processing the image data from the image reading unit, and a second image processing block for processing the image data from either one of the storage unit and the first image processing block. The control unit can select either one of a first route in which the image data from the image reading unit is processed by both the first image processing block and the second image processing block and sent to the storage unit and a second route in which the image data processed by the first image processing block is stored in the storage unit and the image data from the storage unit is processed by the second image processing block and sent to the storage unit, switches a process performed by the second image processing block according to a result of a process by the first image processing block, and switches an input source to the second image processing block between the first image processing block and the storage unit according to a process content of the second image processing block.

Furthermore, according to another aspect of the present invention, there is provided an image processing method including reading an original to obtain image data; processing at least the image data obtained at the reading; storing the image data that is processed at the processing; and controlling the reading, the storing, and the processing. The processing includes first processing including processing the image data obtained at the reading, and second processing including processing either one of the image data stored at the storing and the image data that is processed at the first processing. The controlling includes selecting either one of a first route in which the image data obtained at the reading is processed at both the first processing and the second processing and sent to the storing and a second route in which the image data processed at the first processing is stored at the storing and the image data stored at the storing is processed at the second processing and sent to the storing, switching a process performed at the second processing according to a result of a process at the first processing, and switching an input source to the second processing between the first processing and the storing according to a process content of the second processing.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image processing apparatus and an image processing method according to the present invention are explained in detail below with reference to the accompanying drawings.

A first embodiment of the present invention is explained below with reference to FIGS. 1 to 4. The first embodiment shows an example in which a digital-color multifunction product (MFP) as a compound machine is applied to the image processing apparatus. The MFP integrally includes functions such as a copier function, a facsimile (FAX) function, a printer function, and a function of distributing a received image such as a scanned original image and an image received through the printer function or the FAX function.

Figure 1:
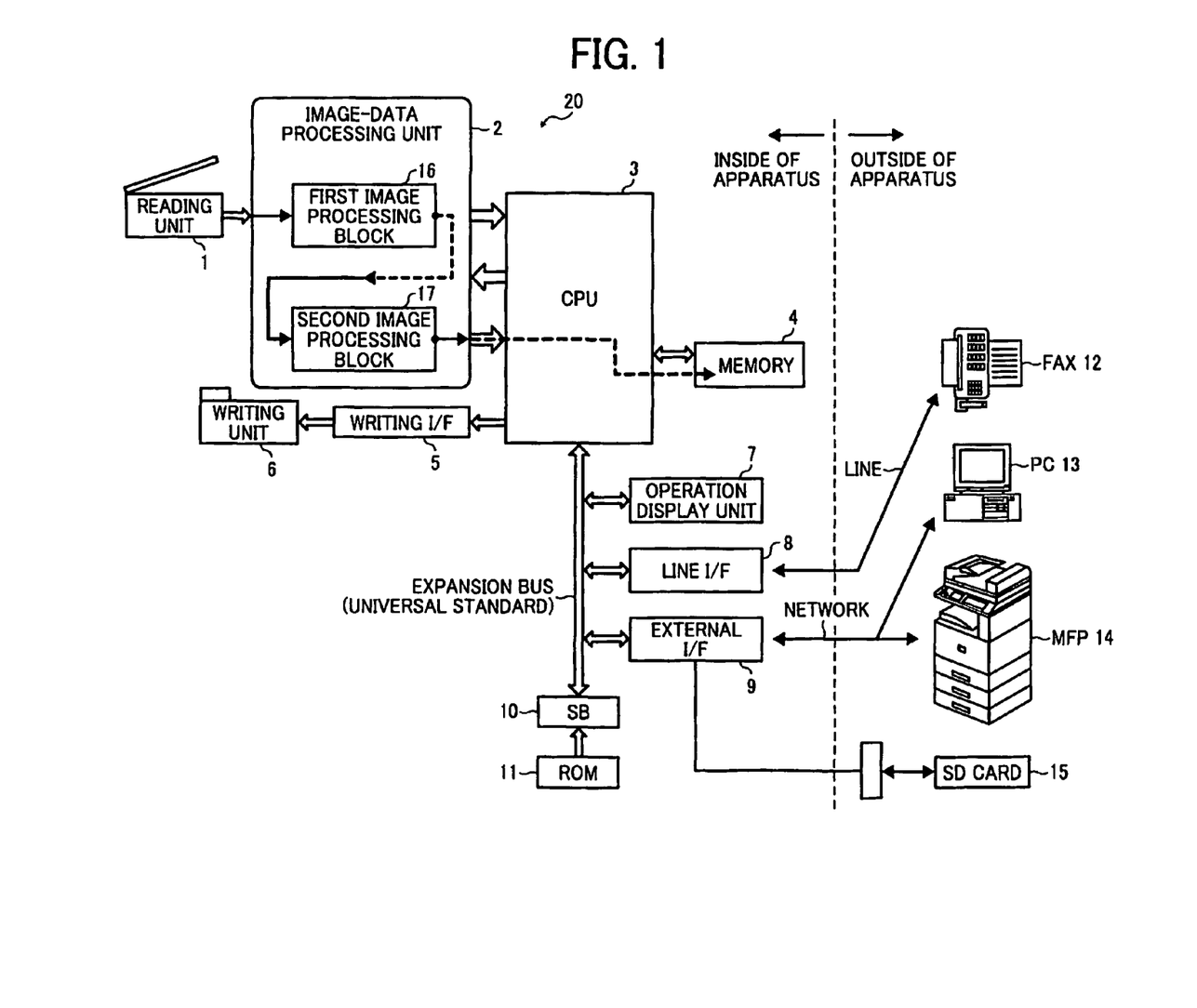
FIG. 1 is a block diagram of a system configuration of a digital-color multifunction product according to a first embodiment of the present invention.
Figure 2:
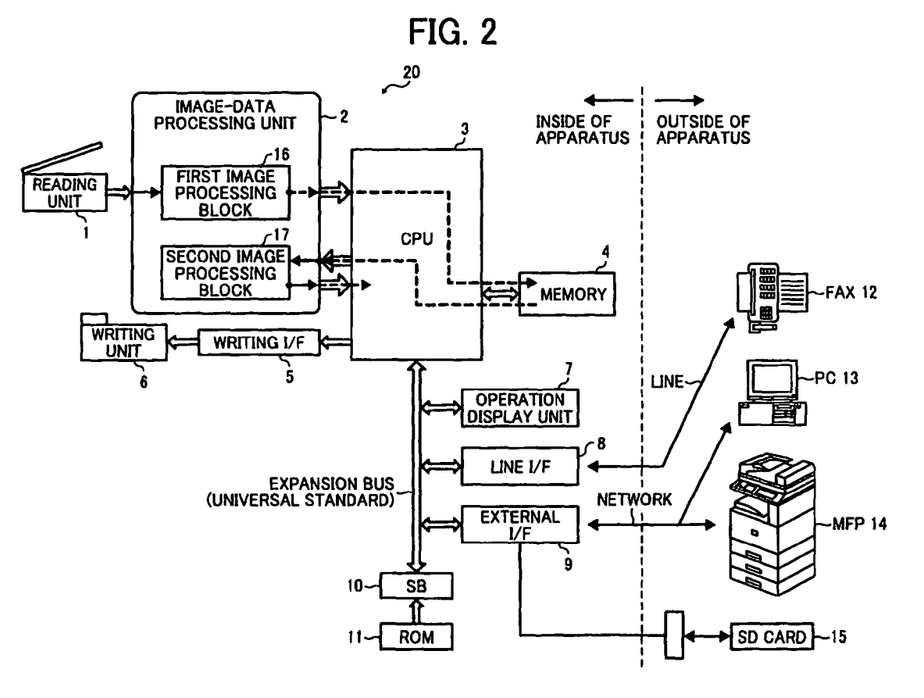
FIG. 2 is a block diagram of a system configuration of the digital-color multifunction product according to the first embodiment.
Figure 3:
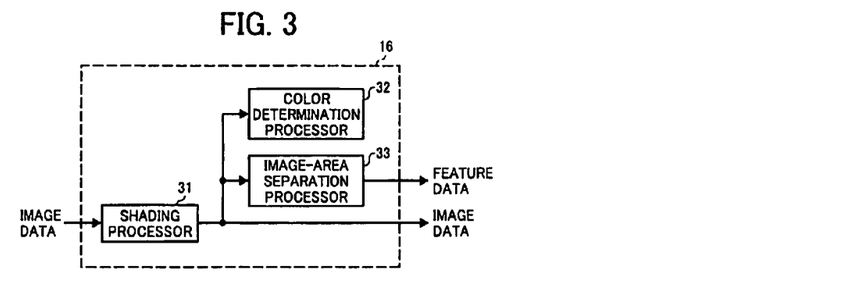
FIG. 3 is a block diagram of a configuration example of a first image processing block in FIGS. 1 and 2.
Figure 4:
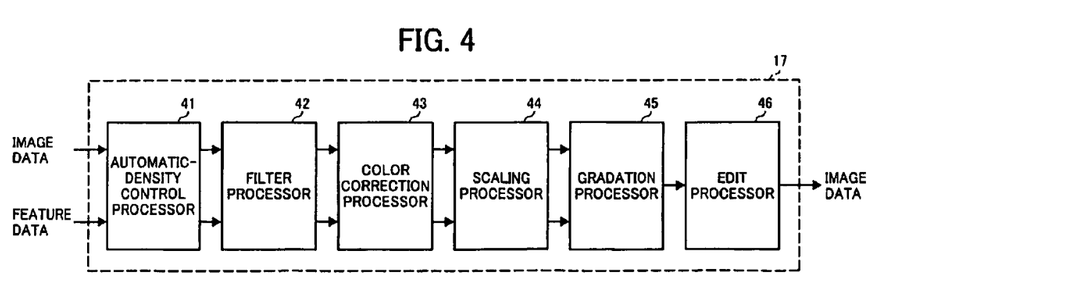
FIG. 4 is a block diagram of a configuration example of a second image processing block in FIGS. 1 and 2.

FIGS. 1 and 2 are block diagrams of a system configuration of an MFP 20 according to the first embodiment. FIG. 3 is a block diagram of a configuration example of a first image processing block in FIGS. 1 and 2, and FIG. 4 is a block diagram of a configuration example of a second image processing block in FIGS. 1 and 2. The MFP 20 shown in FIGS. 1 and 2 includes a reading unit 1 as an image reading unit, an image-data processing unit 2, a first image processing block 16, a second image processing block 17; a central processing unit (CPU) 3 as a control unit, a memory 4 as a storage unit, a writing interface (I/F) 5, a writing unit 6, an operation display unit 7 as a user interface, a line I/F 8, an external I/F 9, a south bridge (S.B.) 10, a read only memory (ROM) 11, and a slot into which a secure digital (SD) card 15 or the like can be inserted. An external device connected to the MFP 20 includes a facsimile device (FAX) 12 connected through a telephone line, and a personal computer (PC) 13 and a digital-color multifunction product (MFP) 14 connected through a network.

The reading unit 1 includes a line sensor composed of a CCD photoelectric conversion element, an analog-to-digital (A/D) converter, and a drive circuit for these components The reading unit 1 scans a set original to acquire grayscale information of the original, generates each 8-bit digital image data for red, green, and blue (RGB) from the grayscale information, and outputs the respectively generated image data.

The image-data processing unit 2 subjects the digital image data output from the reading unit 1 to various image processings. The characteristics of the present invention are such that the image-data processing unit 2 is divided into the first image processing block 16 and the second image processing block 17, and that a connection between the first image processing block 16 and the second image processing block 17 is switched by the CPU 3 to change a processing route to a different route. The details of the image-data processing unit 2 will be explained later.

The CPU 3 is a microprocessor that controls the entire MFP 20. Here, an integrated CPU is used as the CPU in which +α functions are added to a single CPU core which is widely used recently. For example, RM 1100 made by PMC Co. is used as the integrated CPU. The RM 1100 integrates (+α) bus control functions that connect a plurality of peripheral component interconnect (PCI)-Express buses and double inline memory module (DIMM) memory buses using crossbar switches.

The memory 4 is a volatile memory that temporarily stores data to accommodate differences in a processing speed when data is exchanged between devices connected to the CPU 3. The memory 4 temporarily stores a program and intermediate process data when the CPU 3 controls the MFP 20. Because high-speed processing is required, the CPU 3 generally boots the system using a boot program stored in the ROM 11 upon booting, and then performs processes using a program expanded in the memory 4 which can be accessed at high speed. The CPU 3 can freely read and write image data stored in the memory 4. The first embodiment uses the DIMM which is widely used in standardized personal computers.

The writing I/F 5 receives image data for cyan, magenta, yellow, and black (CMYK) sent through the CPU 3 (including the bus control function for the PCI-Express bus), and performs a bus bridge process of outputting the image data to a dedicated I/F of the writing unit 6 as a plotter.

When receiving the image data for CMYK, the writing unit 6 prints out the received image data to a transfer paper using an electrophotographic process with a laser beam.

The operation display unit 7 is an interface portion between the MFP 20 and the user, and includes a liquid crystal display (LCD) and switches. Various statuses and operating methods of the MFP 20 are displayed on the LCD and a key/switch entry from the user is detected thereby. In the first embodiment, the operation display unit 7 is connected to the CPU 3 through the PCI-Express bus.

The line I/F 8 is a device that connects the PCI-Express bus and the telephone line. This device enables the MFP 20 to exchange various data with the FAX 12 through the telephone line.

The external I/F 9 is a device that connects the PCI-Express bus and the external devices. This device enables the MFP 20 to exchange various data with the PC 13 and MFP 14. In the first embodiment, a network (Ethernet: registered trademark) and an external media I/F (SD card slot, etc.) are used as a connection I/F. Specifically, the MFP 20 is connected to the PC 13, the MFP 14, or to the SD card 15 through the external I/F 9.

The S.B. 10 is one of chipsets used in the personal computer, which is a general-purpose electronic device called South Bridge. This electronic device is a general-purpose circuit formed by a bridge function of a bus often used to construct a CPU system including the PCI-Express and industrial standard architecture (ISA) bridge, and in the first embodiment, the S.B. 10 bridges between the bus and the ROM 11.

The ROM 11 is a memory that stores various programs (including boot) used when the CPU 3 controls the MFP 20.

The FAX 12 as the external device is an ordinary facsimile device, which exchanges image data with the MFP 20 through the telephone line.

The PC 13 as the external device is a personal computer, and the user performs various controls for the MFP 20, controls for input/output of image data, and other controls through application software and driver installed in the personal computer.

The MFP 14 as the external device is other digital-color MFP over the network.

The external media I/F is used to input and output image data into and from the MFP 20 in such a manner that the user inserts the SD card 15 or a CompactFlash (registered trademark) card as an external medium with various electronic data including image data recorded thereon, into the external media I/F.

A characteristic configuration of the MFP 20 according to the first embodiment will be explained in detail below. As shown in FIGS. 1 and 2, an inner side of the image-data processing unit 2 is composed of the first image processing block 16 and the second image processing block 17.

The first image processing block 16 receives RGB image data from the reading unit 1 through the dedicated I/F, performs various image processings on the received image data, and outputs the processed image data. An output destination at this time can be switched to either one of the second image processing block 17 and the CPU 3 (including the bus control function of the PCI-Express bus) according to an instruction of the CPU 3.

When the image data is output from the first image processing block 16 to the second image processing block 17 (see FIG. 1), the image data is transmitted thereto through a dedicated I/F internally provided in the processing unit, and when it is output to the CPU 3 (see FIG. 2), the image data is transmitted to the memory 4 through the PCI-Express bus.

The second image processing block 17 receives the RGB image data from the first image processing block 16 through the dedicated I/F internally provided in the processing unit or from the memory 4 through the CPU 3, performs various image processings on the received image data, and outputs the processed image data. The second image processing block 17 selects whether the image data is received from the first image processing block 16 or from the CPU 3 based on the instruction sent from the CPU 3. Both of the image data after being image-processed by the second image processing block 17 are output to the memory 4 through the CPU 3 (see FIGS. 1 and 2).

As explained above, the characteristics of the present invention allow the CPU 3 to select either one of a first route (see the route in FIG. 1) and a second route (see the route in FIG. 2). Specifically, the first route is such that the image data read by the reading unit 1 is processed by the first image processing block 16 and the second image processing block 17 in the image-data processing unit 2, and is sent to the memory 4. The second route is such that the image data processed by the first image processing block 16 is once sent to the memory 4, and image data received from the memory 4 is processed by the second image processing block 17 and is sent to the memory 4.

It is thereby possible to switch between process contents performed by the second image processing block 17 according to the result of the process performed by the first image processing block 16. It is also possible to switch between the first image processing block 16 and the memory 4 according to the process content performed by the second image processing block 17 so that the second image processing block 17 receives the image data from the selected one.

Next, image processings performed using the first image processing block 16 and the second image processing block 17 are explained below by using a copy operation as a typical operation of the MFP 20.

First, the user sets an original on the reading unit 1 of FIG. 1, and sets a desired copy mode and enters "copy start" through the operation display unit 7.

The operation display unit 7 converts information entered by the user to control command data for the inner side of the image-data processing unit 2 and issues the control command data. The issued control command data is notified to the CPU 3 through the PCI-Express bus. The CPU 3 executes the program for a copy operation process based on the control command data for the copy start, and sequentially performs settings and operations required for the copy operation. The operation process is sequentially explained below.

Each 8-bit digital image data for RGB is obtained by scanning the image of the original by the reading unit 1 and is sent to the image-data processing unit 2. In the image-data processing unit 2, the first image processing block 16 and the second image processing block 17 perform the image processings on the image data.

As shown in FIG. 3, the first image processing block 16 includes a shading processor 31, a color determination processor 32, and an image-area separation processor 33.

The shading processor 31 corrects variations in the image data received from the reading unit 1 caused by nonuniform illumination for each scan line or by nonuniform sensitivity for each pixel of the photoelectric conversion element such as CCD, and outputs shading-corrected image data to the nest stage.

The color determination processor 32 receives the shading-corrected image data from the shading processor 31, and determines whether the original is color or monochrome from the color information for the original. The result of determination is fixed when scanning for one page is finished.

The image-area separation processor 33 receives the shading-corrected image data from the shading processor 31, and extracts areas as features of the original from the image data. Specifically, processes include extraction of a halftone-dot portion formed by an ordinary printing, extraction of an edge portion of character or the like, determination on whether the image data is chromatic or achromatic, and determination on white background as to whether a background image is white. Each result of determination is output as feature data for each pixel.

Therefore, the two data: the shading-corrected image data performed by the shading processor 31 and the feature data output from the image-area separation processor 33 are output from the first image processing block 16 to the next stage.

Subsequently, in the case of the first route shown in FIG. 1, the image data and the feature data output from the first image processing block 16 are transmitted to the second image processing block 17.

As shown in FIG. 4, the second image processing block 17 includes an automatic-density control processor 41, a filter processor 42, a color correction processor 43, a scaling processor 44, a gradation processor 45, and an edit processor 46.

The automatic-density control processor 41 switches between enabling and disabling of a process in response to setting by the user. When the process is enabled, the automatic-density control processor 41 automatically detects a density fluctuation range within the original from the received image data, controls a density range to be reproduced, and outputs the controlled density range. For example, when an original has a dark background area like a newspaper original, the automatic-density control processor 41 outputs the image data to the next stage without performing the process on the background area. It is noted that the automatic-density control processor 41 uses only the image data and, therefore, does not use the feature data.

The filter processor 42 functions as a role of controlling image quality, and converts a spatial frequency of the image data. In the first embodiment, the filter processor 42 uses the feature data to perform an appropriate filter process on each area of the original. For example, the filter processor 42 subjects the edge portion to a modulation-transfer-function (MTF) correction process to improve sharpness of a character, and subjects the halftone-dot portion to a smoothing process to minimize moiré.

The color correction processor 43 performs a color correction process so as to match color space characteristic of an output destination. In the copy operation, as specifications of the writing unit 6 as an output destination, the RGB data is converted to CMYK data. In the first embodiment, the color correction processor 43 uses the feature data to control a chromatic portion in the original so that the color in the chromatic portion becomes bright, and to control an achromatic portion therein so that the color in the achromatic portion becomes darkened. In addition, when the output destination is the PC 13 through the external I/F 9, the color correction processor 43 can also convert the RGB data to sRGB as universal standard.

The scaling processor 44 performs a scaling process (resolution conversion process) according to a magnification (enlargement/reduction) specified in the copy operation. The scaling processor 44 does not use the feature data but performs a scaling process also on the feature data so as to be synchronized with the image data.

The gradation processor 45 subjects the image data to a gradation process so as to match the specifications of the writing unit 6. In the first embodiment, the gradation processor 45 uses the feature data to convert a depth of gradation (number of bits) from 8 bits to 2 bits so as to match the writing unit 6 while switching between methods of performing a printer γ process and an error diffusion process for each area.

The edit processor 46 subjects the image data to processes of deleting a frame and deleting a center according to editing specified by the user upon the copy operation.

The second image processing block 17 subjects the image data to a series of processes, to thereby generate the CMYK image data for copy output, and outputs the generated CMYK image data. The CMYK image data output from the image-data processing unit 2 is stored in the memory 4 through the CPU 3.

The stored CMYK image data is sent to the writing unit 6 through the CPU 3 and the writing I/F 5. The writing unit 6 outputs the received CMYK image data to a transfer paper, so that a copy of the original is generated.

As explained above, according to the first embodiment, the image processing apparatus has been diversified, and this leads to restrictions to image processings according to various environments such as types of image processings, a reading speed of the reading unit, or a memory capacity. However, the CPU 3 can select either one of the first route and the second route, and this can meet user requirements for a variety of functions with low cost.

Characteristics of a second embodiment of the present invention are such that the CPU 3 as a control unit connects in series between the first image processing block 16 and the second image processing block 17 in the image-data processing unit 2, and that image processings according to an output destination are completed by the first image processing block 16 and the second image processing block 17.

In the second embodiment, as shown in FIG. 1, the CPU 3 connects in series between the first image processing block 16 and the second image processing block 17, and thus, the image data read by the reading unit 1 is input into the first image processing block 16 of the image-data processing unit 2. Provided in the first image processing block 16 is an image processor that includes a scan-correction process for performing a normalization process on raw image data read by the reading unit 1 or an in-page detection process in which one detection result is derived from each image data for one-page original.

Provided in the second image processing block 17 subsequent to the first image processing block 16 is an image processor that includes an output-correction process for performing an image processing according to an output destination on the normalized image data.

Specifically, the shading processor 31 in the first image processing block 16 of FIG. 3 performs a process of normalizing and correcting nonuniform density in the image data read by the reading unit 1 caused by nonuniform irradiation of the light source thereto. The color determination processor 32 is an in-page detection processor that detects and determines whether the read page of the original is a color page or a monochrome page. The image-area separation processor 33 is a detection processor that detects an image area such as a text area and a picture area.

The automatic-density control processor 41, the filter processor 42, the color correction processor 43, the scaling processor 44, the gradation processor 45, and the edit processor 46 in the second image processing block 17 of FIG. 4 are image processors that perform adjustment and correction processes on the image data according to an output destination and preferences of the user.

Therefore, according to the second embodiment, as shown in FIG. 1, by serially connecting the first image processing block 16 and the second image processing block 17, the processings of image data are performed in a following flow as the reading unit 1→the first image processing block 16→the second image processing block 17→the memory 4, so that the image data is not transmitted and received between the image-data processing unit 2 and the memory 4 in the middle of the image processings. Therefore, it is possible to complete both the correction process for the image data read by the reading unit 1 and the image processings according to the output destination and user preferences.

The image data is not transmitted and received between the image-data processing unit 2 and the memory 4 during the image processings, which enables the time required for data transmission/reception to be eliminated and all the image processings to be completed in a short period of time.

Characteristics of a third embodiment of the present invention are such that the CPU 3 as a control unit once transfers image data processed between the first image processing block 16 and the second image processing block 17 in the image-data processing unit 2 to the memory 4.

In the third embodiment, as shown in FIG. 2, the CPU 3 inputs the image data read by the reading unit 1 to the first image processing block 16 of the image-data processing unit 2, transfers the image data from the image-data processing unit 2 to the memory 4 when the process is finished by the first image processing block 16, reads again the image data from the memory 4 to be input to the second image processing block 17 of the image-data processing unit 2, and transfers the image data from the image-data processing unit 2 to the memory 4 when the process is finished by the second image processing block 17.

In the third embodiment, the explanation on the configurations of the first image processing block 16 and the second image processing block 17 as shown in FIGS. 3 and 4 is similar to that on these of the second embodiment, and thus the explanation is omitted.

For example, when the time required for the image processing performed by the second image processing block 17 exceeds the time required for image read by the reading unit 1, by serially connecting the second image processing block 17 to the first image processing block 16, the second image processing block 17 limits the rate of the operation of the reading unit 1.

According to the third embodiment, as shown in FIG. 2, after the image processing on the image data is completed by the first image processing block 16, the image data is once transferred to the memory 4, and the second image processing block 17 reads the image data from the memory 4 at a speed processable by the second image processing block 17 and perform the image processing thereon. Therefore, the speed of the reading unit 1 is not rate-limited by the time required for image processing performed by the second image processing block 17, and the image processings performed by the first image processing block 16 and the first image processing block 16 can be completed.

It is noted that the image processing, requiring such a time as to rate-limit the image reading speed of the reading unit 1, is not provided in the first image processing block 16. As a possible case in which the image reading speed of the reading unit 1 may be rate-limited, an enlargement process of the scaling processor 44 in the second image processing block 17 of FIG. 4 or the like is considered. For example, when an image is enlarged by the scaling processor 44, the amount of image data as output data becomes larger than that of received data, and thus, it takes more time for transmission of the image data after being enlarged. Therefore, if an enlargement factor becomes a certain value or more, the rate of the image reading speed of the reading unit 1 may be limited, and this requires the configuration as shown in the third embodiment.

According to the third embodiment, as shown in FIG. 2, when the image data read by the reading unit 1 is input into the first image processing block 16 and the image processing for the image data is finished thereby, the image data is once transferred to the memory 4 through the image-data processing unit 2. Therefore, even if there occurs a difference between the reading speed of the reading unit 1 and the processing speed of the second image processing block 17, the difference can be accommodated.

Characteristics of a fourth embodiment of the present invention are such that, similarly to the third embodiment, the CPU 3 as a control unit once transfers image data processed between the first image processing block 16 and the second image processing block 17 in the image-data processing unit 2 to the memory 4. However, the fourth embodiment is particularly useful for the case in which the second image processing block 17 determines an image processing parameter based on the result of process for one page performed by the first image processing block 16, to perform the image processing.

In the fourth embodiment, the explanation on the configurations of the first image processing block 16 and the second image processing block 17 as shown in FIGS. 3 and 4 is similar to that on these of the second embodiment, and thus the explanation is omitted.

In the fourth embodiment, as shown in FIG. 2, the image data is once transferred to the memory 4 through between the first image processing block 16 and the second image processing block 17. Specifically, when the image processing performed by the first image processing block 16 is finished, the image data is transferred from the image-data processing unit 2 to the memory 4, and thus, the second image processing block 17 can read the image data from the memory 4 after the first image processing block 16 finishes the image processing for one page, and perform the image processing.

This configuration can be applied to the case in which the first image processing block 16 processes the image data for one image and performs the detection process so as to obtain one detection result for each page. Consequently, the second image processing block 17 can perform the image processing by switching the image processing parameters based on the detection result. In other words, even when the image processing needs to be preformed using a different image processing parameter for each page, the configuration as shown in the fourth embodiment allows performance of an appropriate image processing optimal for each page.

For example, as a condition that the fourth embodiment becomes effective, one of the image processings in which one detection result is obtained for each page is the color determination processor 32 of FIG. 3. A color determination process performed by the color determination processor 32 is a detection process for detecting whether the page is a color original or monochrome original. Specifically, the color determination process is performed in such a manner that when the first image processing block 16 finishes the image processing for each page and detects whether the original is color or monochrome, the second image processing block 17 can switch between the image processing parameters for the color one and for the monochrome one based on the detection result of the color determination process, and perform the image processing.

As explained above, the fourth embodiment can provide the image processing apparatus capable of performing the image processings by switching settings of image processing parameters used at a subsequent stage for each page based on a process result obtained after the entire image data for one page is processed. The fourth embodiment is useful particularly for setting parameters related to the color determination process, which allows an appropriate image processing optimal for each page.

Figure 5:
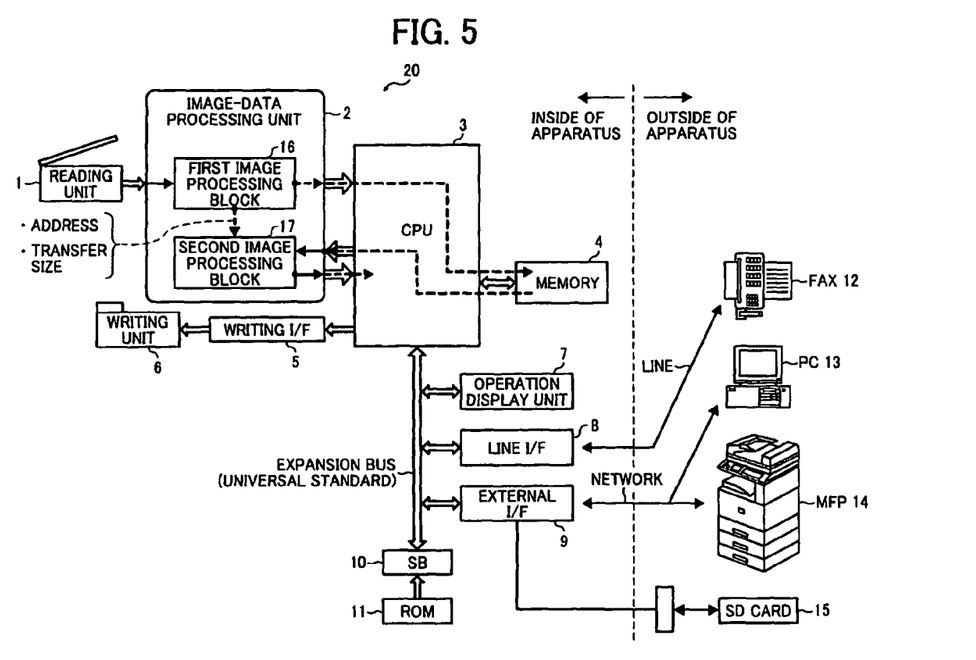
FIG. 5 is a block diagram of a system configuration of a digital-color multifunction product according to a fifth embodiment of the present invention.

FIG. 5 is a block diagram of a system configuration of a digital-color multifunction product according to a fifth embodiment of the present invention. Characteristics of the fifth embodiment are such that the CPU 3 as a control unit once transfers image data processed between the first image processing block 16 and the second image processing block 17 in the image-data processing unit 2 to the memory 4, and sets a read start address and a transfer data size, used when the second image processing block 17 reads the image data from the memory 4, in the second image processing block 17 through the first image processing block 16 concurrently when the image data is written to the memory 4 through the first image processing block 16.

As shown in FIG. 5, when the image data image-processed by the first image processing block 16 is transferred to the memory 4, the read start address and the transfer data size as set values are automatically notified from the first image processing block 16 to the second image processing block 17 so that even if the CPU 3 does not set these data, the second image processing block 17 can read the image data from the memory 4 without referring to them.

As explained above, according to the fifth embodiment, when reading the image data from the memory 4, the second image processing block 17 can read it even when the CPU 3 does not set the read start address and the transfer data size. Therefore, the image processing performed by the second image processing block 17 can be speedily started.

Figure 6:
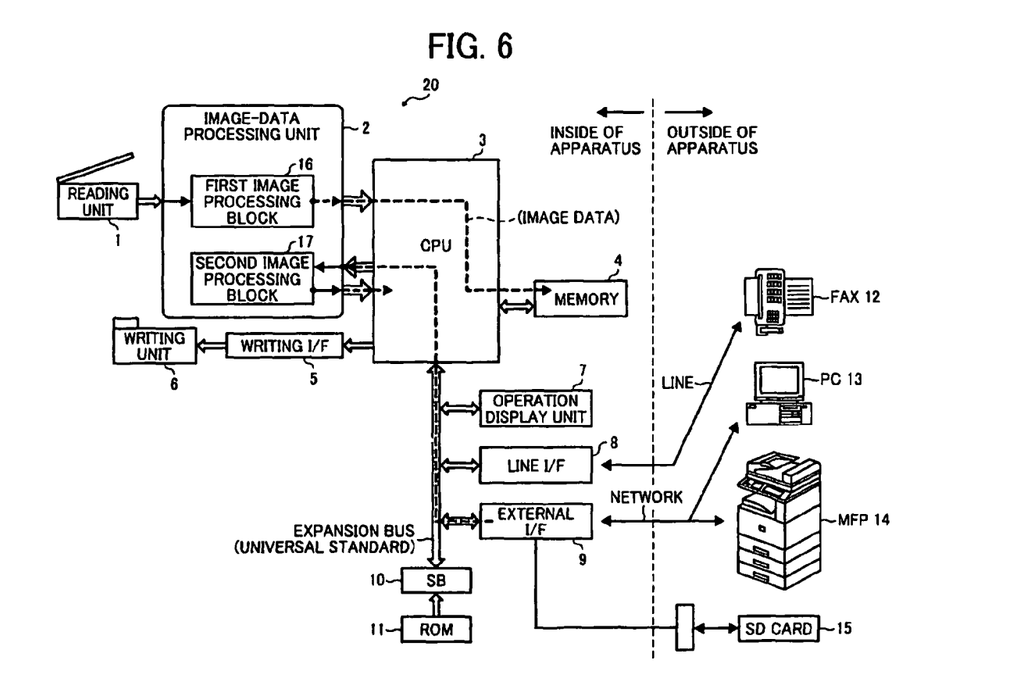
FIG. 6 is a block diagram of a system configuration of a digital-color multifunction product according to a sixth embodiment of the present invention.

FIG. 6 is a block diagram of a system configuration of a digital-color multifunction product according to a sixth embodiment of the present invention. Characteristics of the sixth embodiment are such that the MFP 20 is provided with the external I/F 9 that transmits and receives image data with external devices, and that while the first image processing block 16 performs the image processing on the image data and sends it to the memory 4, the second image processing block 17 reads image data from an external device through the external I/F 9 and performs the image processing on the image data.

As shown in FIG. 6, when the route through which the image data image-processed by the first image processing block 16 is once stored in the memory 4 is selected, the second image processing block 17 may not perform any process during that period. Therefore, to make best use of a module being not in use, while the first image processing block 16 performs the image processing on the image data to be stored in the memory 4, the second image processing block 17 is caused to read image data from an external device through the external I/F 9, perform image processings thereon according to preferences of the user and an output destination, and output the image data after being image-processed to a specified output destination.

In the sixth embodiment, the external device from which the second image processing block 17 reads the image data includes a hard disk drive (HDD), an SD memory, a compact disk (CD) drive, a digital versatile disk (DVD) drive, and external devices such as the PC 13 and the MFP 14 connected through the network.

As explained above, according to the sixth embodiment, while the first image processing block 16 performs the image processing on the image data to be stored in the memory 4, the second image processing block 17 can be used to read image data from an external device through the external I/F 9, and perform image processings, so that the module being not in use can be made best use of, and the processes can be efficiently performed by concurrently operating the first image processing block 16 and the second image processing block 17 to simultaneously perform image processings on the two image data.

Figure 7:
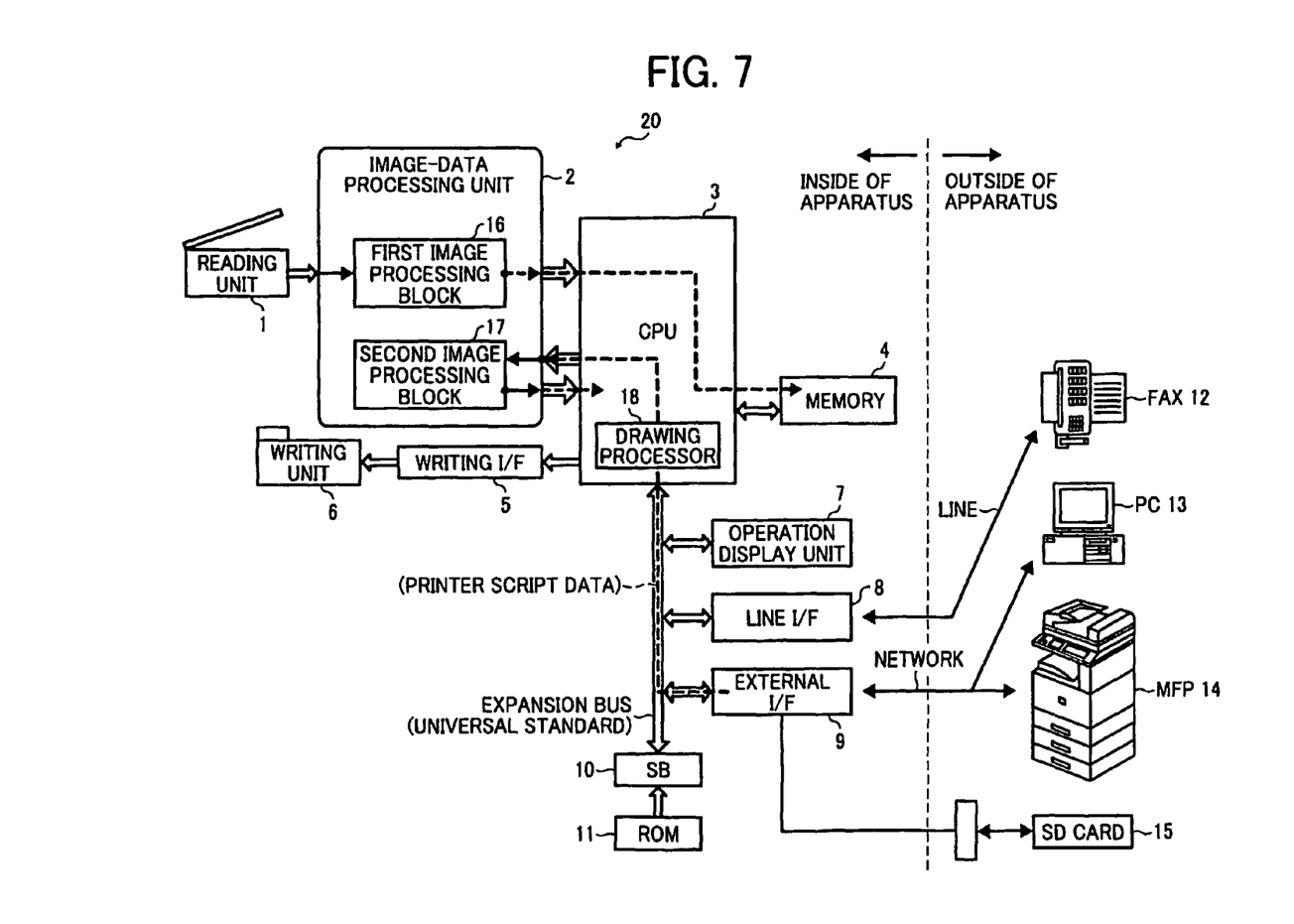
FIG. 7 is a block diagram of a system configuration of a digital-color multifunction product according to a seventh embodiment of the present invention.

FIG. 7 is a block diagram of a system configuration of a digital-color multifunction product according to a seventh embodiment of the present invention. Characteristics of the seventh embodiment are such that the MFP 20 is provided with the external I/F 9 that receives printer script data from an external device and with a drawing processor 18 that performs a drawing process on image data based on the printer script data, and that while the first image processing block 16 performs the image processing on the image data and sends it to the memory 4, the second image processing block 17 receives image data drawing-processed by the drawing processor 18 using the printer script data received from the PC 13 through the external I/F 9, to perform image processing thereon.

Specifically, as shown in FIG. 7, when the route through which the image data image-processed by the first image processing block 16 is once stored in the memory 4 is selected, the second image processing block 17 may not perform any process during that period. Therefore, to make best use of the module being not in use, while the first image processing block 16 performs the image processing on the image data and sends it to the memory 4, the second image processing block 17 is caused to receive image data drawing-processed by the drawing processor 18 of the CPU 3 using the printer script data received from the PC 13 through the external I/F 9, to perform image processing thereon according to preferences of the user.

Because the image-processed data is printer data, it is basically output to the writing unit 6, however, the image data after being image-processed may be output to an output destination specified by the user. Further, when the image data is subjected to the drawing process by the drawing processor 18 of the CPU 3 to obtain image data from the printer script data, this image data can be handled in the same manner as the image data read by the reading unit 1, and thus the second image processing block 17 can perform the image processing thereon.

As explained above, according to the seventh embodiment, while the first image processing block 16 performs the image processing on the image data to be stored in the memory 4, the second image processing block 17 is caused to receive image data drawing-processed by the drawing processor 18 of the CPU 3 using the printer script data received from the PC 13 through the external I/F 9, and perform the image processing on the image data, so that the module being not in use can be made best use of. Moreover, the processes can be efficiently performed by concurrently operating the first image processing block 16 and the second image processing block 17 to simultaneously perform image processings on two image data such as the image data read by the reading unit 1 and the printer script data.

Figure 8:
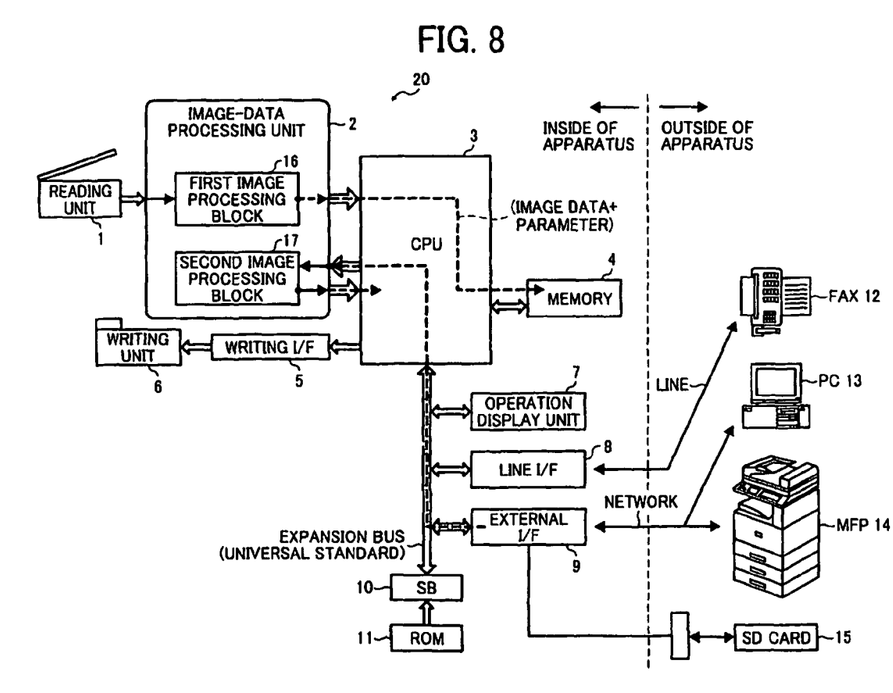
FIG. 8 is a block diagram of a system configuration of a digital-color multifunction product according to an eighth embodiment of the present invention.

FIG. 8 is a block diagram of a system configuration of a digital-color multifunction product according to an eighth embodiment of the present invention. Characteristics of the seventh embodiment are such that when the reading unit 1 is used to read image data and the first image processing block 16 performs the image processing on the read image data to send it to the memory 4, the image processing parameters used when the second image processing block 17 performs the image processing are transferred to the memory 4, in which they are stored.

As shown in FIG. 8, the image data read by the reading unit 1 is subjected to the image processing by the first image processing block 16, sent to the memory 4, and stored therein. At that time, the image processing parameters used when the second image processing block 17 performs the image processing afterward are stored in the memory 4 together with the image data.

The first image processing block 16 performs the image processing on the image data read by the reading unit 1, and also the second image processing block 17 reads image data from an external device through the external I/F 9, and performs the image processing thereon. When the image processing performed on the image data received from the external I/F 9 is finished, the second image processing block 17 is not occupied by the task. The second image processing block 17 then reads the image data and the image processing parameters stored in the memory 4, sets the image processing parameters in modules in the second image processing block 17, and performs the image processings on the image data. The image data after being image-processed is output to an output destination specified by the user.

As explained above, according to the eighth embodiment, when the first image processing block 16 performs the image processing on the image data and sends it to the memory 4 where it is stored, the image processing parameters used when the second image processing block 17 performs the image processing are stored in the memory 4 together with the image data. Therefore, the second image processing block 17 reads the image data and the image processing parameters stored in the memory 4 after the image processing performed on the image data received from the external device is finished, so that the image processing can speedily restarted.

The programs executed by the image processing apparatuses according to the embodiments are provided by being previously installed in the ROM 11 as shown in FIGS. 1, 2, and 5 to 8.

The program executed by the image processing apparatus according to the eighth embodiment may be provided by being recorded in a computer-readable recording medium such as a compact disk read only memory (CD-ROM), a flexible disk (FD), a compact disk recordable (CD-R), and a digital versatile disk (DVD), as a file in an installable format or in an executable format.

Furthermore, the program executed by the image processing apparatus according to the eighth embodiment may be provided by being stored on a computer connected to a network such as the Internet and being downloaded through the network. Moreover, the program executed by the image processing apparatus according to the eighth embodiment may be provided or distributed through the network such as the Internet.

The program executed by the image processing apparatus according to the eighth embodiment is formed of modules including the components such as the image reading unit, the storage unit, the image-data processing unit, the control unit, the first image processing block, the second image processing block, the external I/F, and the drawing processor. As actual hardware, the CPU (processor) 3 reads the program from the ROM 11 and executes it, and the components are thereby loaded on a main storage device, so that the image reading unit, the storage unit, the image-data processing unit, the control unit, the first image processing block, the second image processing block, the external I/F, and the drawing processor, or the like are generated on the main storage device.

According to the present invention, it is possible to meet user requirements for a variety of functions at low cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
an image reading unit that reads an original to obtain image data;
a storage unit that stores therein image data;
an image-data processing unit that processes the image data from either one of the image reading unit and the storage unit; and
a control unit that controls the image reading unit, the storage unit, the image-data processing unit, and a connection between the units, wherein
the image-data processing unit includes
a first image processing block for processing the image data from the image reading unit, and
a second image processing block for processing the image data from either one of the storage unit and the first image processing block, and
the control unit can select either one of a first route in which the image data from the image reading unit is processed by both the first image processing block and the second image processing block and sent to the storage unit and a second route in which the image data processed by the first image processing block is stored in the storage unit and the image data from the storage unit is processed by the second image processing block and sent to the storage unit, switches a process performed by the second image processing block according to a result of a process by the first image processing block, and switches an input source to the second image processing block between the first image processing block and the storage unit according to a process content of the second image processing block.

2. The image processing apparatus according to claim 1, wherein
the control unit serially connects the first image processing block and the second image processing block, and completes entire image processing with the first image processing block and the second image processing block according to an output destination.

3. The image processing apparatus according to claim 1, wherein
when the second route is selected, and if an input speed of the image data from the image reading unit exceeds a processing speed of the second image processing block, the control unit saves the image data in the storage unit after the process performed by the first image processing block is finished, and performs an image processing by reading out the image data from the storage unit at a speed at which the second image processing block can process the image data, to balance processing speeds among the image reading unit, the first image processing block, and the second image processing block.

4. The image processing apparatus according to claim 1, wherein
when the second route is selected, and when the second image processing block performs an image processing by determining an image processing parameter based on a process result of the first image processing block for one page, the control unit saves the image data in the storage unit after the process performed by the first image processing block is finished, and performs an image processing by reading out the image data from the storage unit after waiting for a completion of an image processing for one page by the first image processing block, so that the second image processing block performs the image processing using a different image processing parameter for each page.

5. The image processing apparatus according to claim 3, wherein
the control unit automatically sets a read start address and a transfer data size at a time when the second image processing block reads out the image data from the storage unit from the first image processing block to the second image processing block in parallel to writing of the image data from the first image processing block to the storage unit.

6. The image processing apparatus according to claim 4, wherein
the control unit automatically sets a read start address and a transfer data size at a time when the second image processing block reads out the image data from the storage unit from the first image processing block to the second image processing block in parallel to writing of the image data from the first image processing block to the storage unit.

7. The image processing apparatus according to claim 1, further comprising:
an external interface unit that transmits and receives image data to and from an external device, wherein
when the second route is selected, during when the first image processing block processes the image data from the image reading unit and sends processed image data to the storage unit, the second image processing block reads out image data from the external device through the external interface and performs an image processing on read image data.

8. The image processing apparatus according to claim 1, further comprising:
an external interface unit that receives printer script data from an external device; and
a drawing processing unit that performs a drawing process based on the printer script data input through the external interface unit, wherein
when the second route is selected, during when the first image processing block processes the image data from the image reading unit and sends processed image data to the storage unit, the second image processing block performs an image processing on image data obtained by drawing the received printer script data by the drawing processing unit.

9. The image processing apparatus according to claim 7, wherein
when the image data from the image reading unit is processed by the first image processing block and sent to the storage unit, the control unit saves an image processing parameter used by the second image processing block together with the image data, sets saved image processing parameter in the second image processing block after the second image processing block finishes an image processing on data received through the external interface, and resumes the image processing on saved image data.

10. The image processing apparatus according to claim 8, wherein
when the image data from the image reading unit is processed by the first image processing block and sent to the storage unit, the control unit saves an image processing parameter used by the second image processing block together with the image data, sets saved image processing parameter in the second image processing block after the second image processing block finishes an image processing on data received through the external interface, and resumes the image processing on saved image data.

11. An image processing method comprising:
reading an original to obtain image data;
processing at least the image data obtained at the reading;
storing the image data that is processed at the processing; and
controlling the reading, the storing, and the processing, wherein
the processing includes
first processing including processing the image data obtained at the reading, and
second processing including processing either one of the image data stored at the storing and the image data that is processed at the first processing, and
the controlling includes
selecting either one of a first route in which the image data obtained at the reading is processed at both the first processing and the second processing and sent to the storing and a second route in which the image data processed at the first processing is stored at the storing and the image data stored at the storing is processed at the second processing and sent to the storing,
switching a process performed at the second processing according to a result of a process at the first processing, and
switching an input source to the second processing between the first processing and the storing according to a process content of the second processing.

12. The image processing method according to claim 11, wherein
the controlling further includes
serially connecting the first processing and the second processing, and
completing entire image processing with the first processing and the second processing according to an output destination.

13. The image processing method according to claim 11, wherein
when the second route is selected, and if an input speed of the image data at the reading exceeds a processing speed of the second processing, the controlling further includes
saving the image data after the process performed at the first processing is finished, and
performing an image processing by reading out saved image data at a speed at which the image data can be processed at the second processing, to balance processing speeds among the reading, the first processing, and the second processing.

14. The image processing method according to claim 11, wherein
when the second route is selected, and when the second processing further includes performing an image processing by determining an image processing parameter based on a process result of the first processing for one page, the controlling further includes
saving the image data after the process performed at the first processing is finished, and
performing an image processing by reading out saved image data after waiting for a completion of an image processing for one page at the first processing, so that the second processing includes performing the image processing using a different image processing parameter for each page.

15. The image processing method according to claim 13, wherein
the controlling further includes automatically setting a read start address and a transfer data size at a time when the image data is read at the second processing from the first processing to the second processing in parallel to writing of the image data from the first processing to the storing.

16. The image processing method according to claim 14, wherein
the controlling further includes automatically setting a read start address and a transfer data size at a time when the image data is read at the second processing from the first processing to the second processing in parallel to writing of the image data from the first processing to the storing.

17. The image processing method according to claim 11, further comprising:
transmitting and receiving image data to and from an external device, wherein
when the second route is selected, during when the image data obtained at the reading is processed at the first processing and processed image data is sent to the storing, the second processing further includes
reading image data from the external device, and
performing an image processing on read image data.

18. The image processing method according to claim 11, further comprising:
receiving printer script data from an external device; and
performing a drawing process based on the printer script data input at the receiving, wherein
when the second route is selected, during when the image data obtained at the reading is processed at the first processing and processed image data is sent to the storing, the second processing includes performing an image processing on image data obtained by drawing the received printer script data at the performing a drawing process.

19. The image processing method according to claim 17, wherein
when the image data obtained at the reading is processed at the first processing and sent to the storing, the controlling further includes
saving an image processing parameter used at the second processing together with the image data,
setting saved image processing parameter in the second processing after an image processing is finished on received data at the second processing, and
resuming the image processing on saved image data.

20. The image processing method according to claim 18, wherein
when the image data obtained at the reading is processed at the first processing and sent to the storing, the controlling further includes
saving an image processing parameter used at the second processing together with the image data,
setting saved image processing parameter in the second processing after an image processing is finished on received data at the second processing, and
resuming the image processing on saved image data.

* * * * *

UNITED STATES PATENT AND TRADEMARK OFFICE
CERTIFICATE OF CORRECTION

| | | |
|---|---|---|
| PATENT NO. | : 8,274,684 B2 | Page 1 of 1 |
| APPLICATION NO. | : 12/382279 | |
| DATED | : September 25, 2012 | |
| INVENTOR(S) | : Hiroaki Fukuda and Tomoyuki Yoshida | |

It is certified that error appears in the above-identified patent and that said Letters Patent is hereby corrected as shown below:

Title Page, Item (54) and in the Specification, Column 1, line 1 the Title should read:

IMAGE PROCESSING APPARATUS AND IMAGE PROCESSING METHOD FOR PROCESSING READING BLOCKS

Signed and Sealed this
Twenty-eighth Day of May, 2013

Teresa Stanek Rea
*Acting Director of the United States Patent and Trademark Office*